July 8, 1969 M. D. VAN PEURSEM 3,454,285
OFFSET ACTUATED HITCH

Filed Aug. 11, 1967 Sheet 1 of 2

INVENTOR.
MARVIN D. VAN PEURSEM
BY Bair, Freeman & Molinare
ATTORNEYS.

United States Patent Office 3,454,285
Patented July 8, 1969

3,454,285
OFFSET ACTUATED HITCH
Marvin D. Van Peursem, Newton, Iowa, assignor to Winpower Manufacturing Company, Newton, Iowa, a corporation of Iowa
Filed Aug. 11, 1967, Ser. No. 660,053
Int. Cl. B60d 1/00, 7/00
U.S. Cl. 280—468                                    8 Claims

ABSTRACT OF THE DISCLOSURE

An independent-wheel implement for connecting a planter or the like to a cultivator or the like and having means to actuate an offset mechanism to compensate for travel on side hills. An extensible and retractable cylinder and piston unit is provided to adjust the degree of offset.

---

One object of my present invention is to provide a wheel-mounted hitch implement which can be connected to a cultivator and which in turn may have a corn planter, grain drill or the like hitched thereto in order to minimize the number of trips of a tractor across a field during the preparation of a seed bed and the planting thereof.

Another object is to provide an offset actuated hitch implement of comparatively simple and inexpensive construction adapted to be attached to a cultivator and having a hitch arm to which a planter or grain drill may be hitched.

Another object is to provide an offset actuated hitch in which a main frame is mounted on caster wheels and is connected by a parallelogram arm system to a pair of brackets that are adapted to be secured to a cultivator or the like, the connections of the parallelogram arm system to the brackets being such that the system can be readily connected to the brackets for relatively quick set-up of the offset actuated hitch when it is desirable to use it, or disconnection thereof from the brackets when it is no longer needed.

A further object is to provide an independent-wheel hitch implement comprising a main frame which is caster wheel-supported, and a parallelogram arm system connecting the main frame to the pair of brackets so that the main frame is kept in a desirable position during up, down and sidewise movements of the main frame as it trails the cultivator.

Still another object is to provide a connecting element between one of the brackets and one arm of the parallelogram arm system to predetermine the lateral offset of the main frame relative to the cultivator.

An additional object is to provide the connecting element in the form of a cylinder and piston unit that can be actuated from the hydraulic system of the tractor so as to vary the degree of offset to the right or left as required during combined operations such as cultivating and planting.

With these and other objects in view, my invention consists in the construction, arrangement and combination of the various parts of my offset actuated hitch, whereby the objects above contemplated are attained, as hereinafter more fully set forth, pointed out in my claims and illustrated in detail on the accompanying drawing, wherein:

Figure 1:
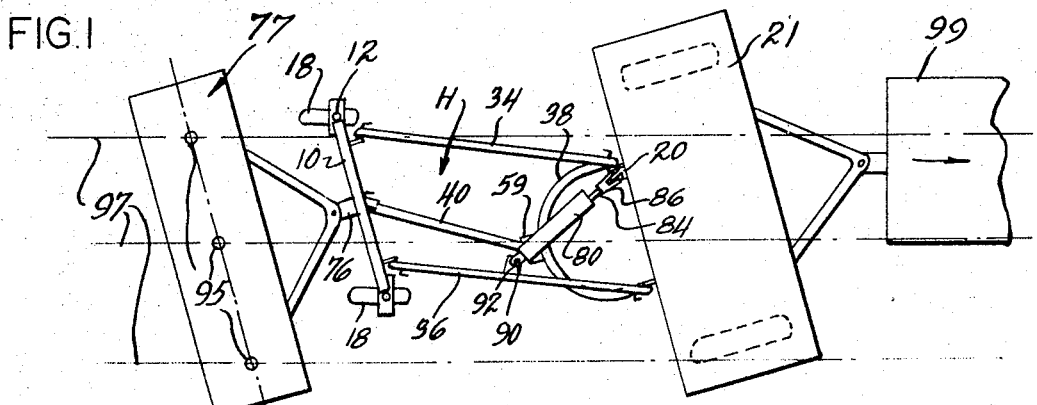
FIG. 1 is a diagrammatic plan view of a tractor, a cultivator, my offset actuated hitch and a grain drill showing the hitch in a left hand offset position to compensate for a side hill which slopes downwardly toward the right of the vehicles.

On the accompanying drawings I have used the reference numeral 10 to indicate a main frame of bar-like character having vertical caster bearings 12 at its ends. A pair of caster yokes 14 are provided having vertical caster shanks 16 which are swivel-mounted in the caster bearings 12. Wheels 18 are journalled in the yokes 14 and serve to support the main frame 10.

Left and right hand brackets 20 and 22 are provided which are adapted to be attached to a tool bar 19 of a cultivator 21. U-bolts 23 may be provided for this purpose as shown in FIGS. 2, 4 and 5.

Figure 2:
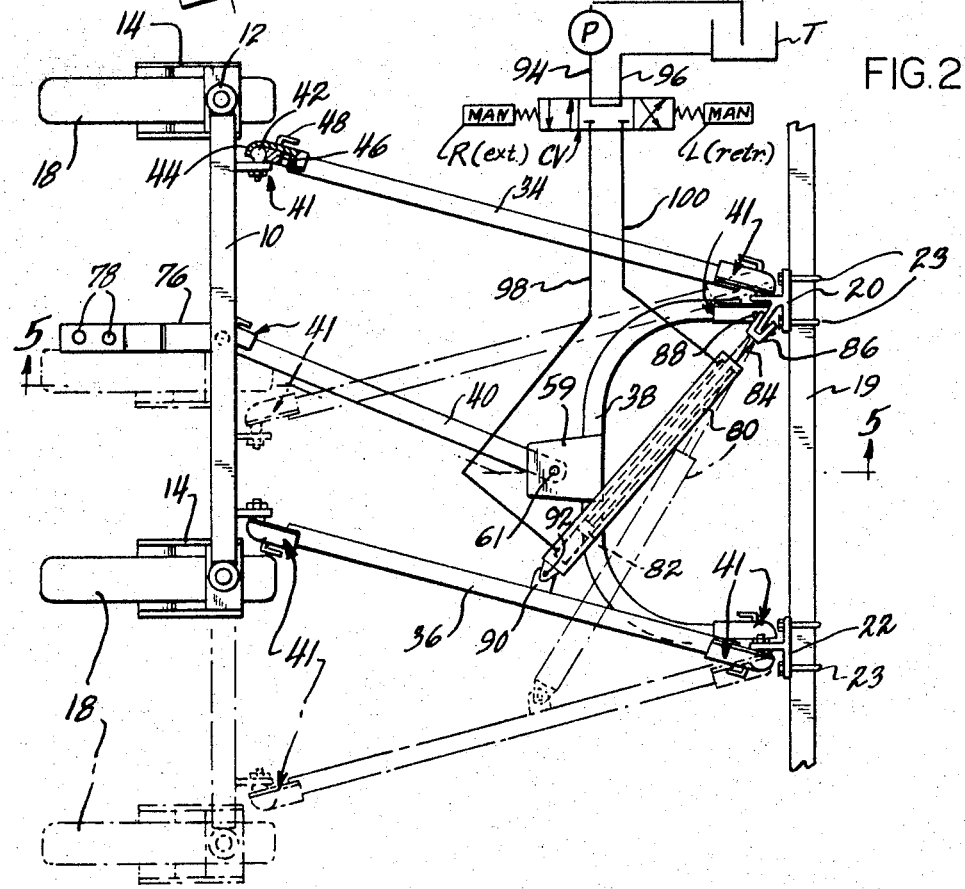
FIG. 2 is a plan view of my offset actuated hitch showing the same in detail and offset to the left, offset to the right being illustrated by dot-and-dash lines, and a hydraulic control diagram being included.

A parallelogram arm system connects the main frame 10 to the brackets 20 and 22 and comprises a left primary arm 34, a right primary arm 36, a secondary arm yoke 38 and a secondary arm 40, the arrangement being shown particularly in FIG. 2. The forward and rearward ends of the arms 34 and 36, the ends of the yoke 38 and the rearward end of the arm 40 are connected to the brackets 20 and 22, and to the main frame 10, by universal connections shown generally at 41 which may be of the ball and socket type used for trailer hitches. The connection 41 at the rearward end of the arm 34 in FIG. 2 is shown in section as comprising a ball 42, a socket 44, a retainer block 46 and a release and locking handle 48, which are common in the trailer hitch art and accordingly need not be described in detail.

Figure 6:
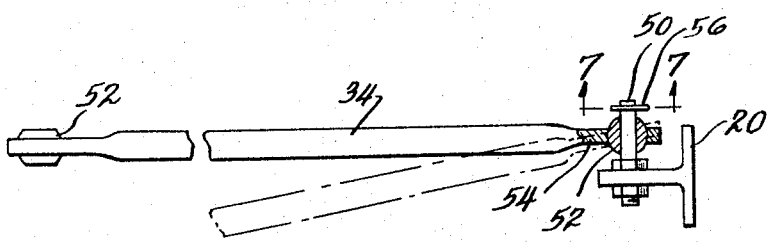
FIG. 6 is a plan view, partly in section, showing a modified type of arm used in place of certain arms shown in FIGS. 1, 2 and 4.
Figure 7:
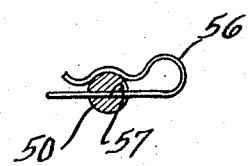
FIG. 7 is an enlarged sectional view on the line 7—7 of FIG. 6.

Another type of universal connection is shown in FIG. 6 wherein the arm 34 is operatively connected to a pin 50 on the bracket 20 by extending through a ball 52 on the periphery of which a ball receiving end 54 partially surrounds the ball for pivoting or universal movement thereabouts. A retainer pin 56, which is readily removable, extends through a cross hole 57 of the pin 50 as shown in FIG. 7. Seven connections of this type may be provided in place of the seven ball and socket connections 41.

Figure 4:
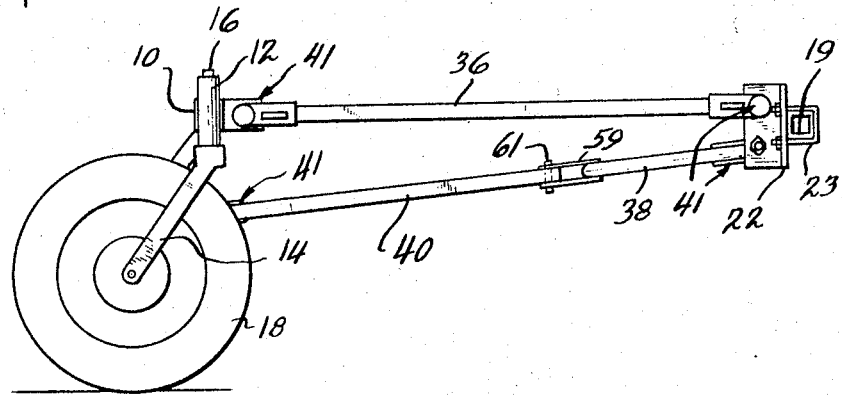
FIG. 4 is a side elevation of the hitch illustrated in FIG. 2.
Figure 5:
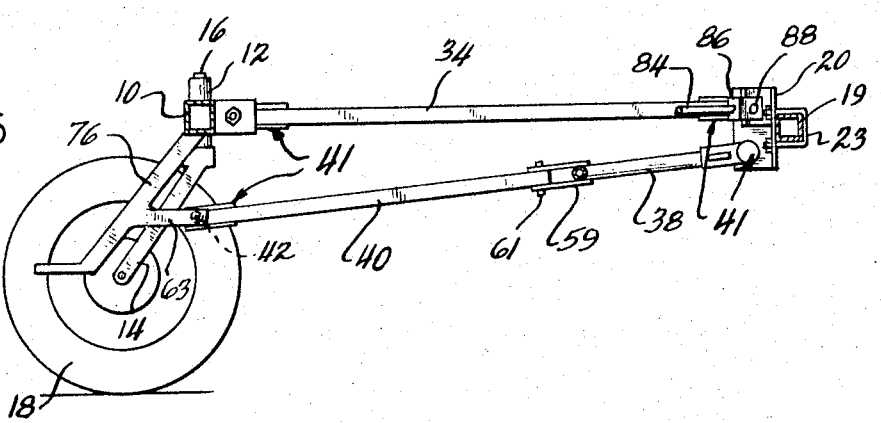
FIG. 5 is a sectional view thereof on the line 5—5 of FIG. 2.

The yoke 38 is provided with a pair of plates 59 welded thereto and carrying a vertical pin 61 which serves as a pivot for the forward end of the secondary arm 40 and coacts with the upper and lower surfaces thereof to retain the arm 40 in alignment with the yoke 38 as shown in FIGS. 4 and 5. The ball 42 of the connection 41 at the rearward end of the arm 40 is carried by a bracket 63 shown in FIG. 5 which in turn is part of a planter hitch arm 76 having a pair of holes 78 therein as shown in FIG. 2 for hitching a corn planter, grain drill or the like thereto. In FIG. 1 a grain drill 77 is illustrated.

I provide a cylinder and piston unit wherein the cylinder is shown at 80, the piston at 82 and a piston rod at 84 in FIG. 2. The outer end of the rod 84 is provided with a yoke 86 connected by a pivot pin 88 to the bracket 20 whereas the outer end of the cylinder 80 is pivoted to a bracket 90 on the arm 36 by a pivot pin 92.

It will now be obvious by an inspection of FIG. 2 that the piston 82 is retracted within the cylinder 80 and this causes left hand offset of the main frame 10 relative to the tool bar 19. When the piston is an extended position relative to the cylinder, right hand offset occurs as shown by dot-and-dash lines in FIG. 2.

Most tractors nowadays are equipped with a hydraulic system such as a pump P, tank or reservoir T and supply and return pipes 94 and 96 as shown diagrammatically in FIG. 2. A control valve CV is provided in conjunction with the cylinder and piston unit 80, 82, 84, and is connected by hydraulic hoses 98 and 100 to the inner and outer ends of the cylinder 80. The control valve may be spring-centered and manually operated, a push button R being provided for extending the piston in the cylinder for right hand offset as shown by dot-and-dash lines in FIG. 2, and a push button L for left hand offset as shown by solid lines therein which effects retraction of the piston relative to the cylinder. The degree of offset can thus be nicely controlled as required, the appropriate button R or L being pressed until such desired degree of offset is obtained and then released, whereupon the piston is locked in the cylinder at that position.

In an attempt to minimize the number of trips across a field to prepare a seed bed and plant corn or other grain, more and more farmers are using readily available high horsepower tractors to combine several field operations. A good example is towing a corn planter or grain drill (for soybean, wheat, etc., crops) behind a field cultivator. For proper planter performance and seed placement it is important that the planter hitch remain at a relative uniform height. Accordingly, an independent-wheel hitch implement of the kind herein disclosed may be attached to the rear of the field cultivator, and the planter in turn hitched to it. This affords a very simple arrangement and provides for offset for traveling on hillsides as will now be explained.

With the foregoing described arrangements such as shown in FIG. 1 the series of implements is somewhat "strung out" literally. When operating even on the slightest side hill, the planter to the rear of this "string" will tend to drift downhill, thus preventing the planting of desirable straight rows for ease of cultivation and harvesting. By utilizing a remote control hydraulic cylinder and piston unit in the type of wheel-supported hitch implement herein disclosed, the hitch can be offset so as to position the planter or grain drill to counteract the tendency to shift downhill. The cylinder and piston unit may be manually controlled by the operator in the tractor seat, or sensing devices may be provided to permit automatic control. Also other actuating means such as electric motors or hand winches can be used instead of the hydraulic cylinder.

Figure 3:
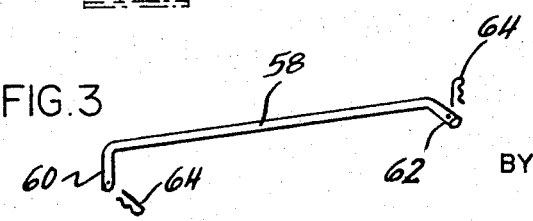
FIG. 3 is a perspective view of a connecting element which can be substituted for a cylinder and piston unit shown in FIGS. 1 and 2.

In FIG. 3 a rod 58 is shown having a vertical end 60 and a horizontal end 62 provided with retainer keys 64 similar to the key 56 shown in FIG. 7. This rod may be of such length that the main frame 10 is centered relative to the tool bar 19 and thus the cylinder and piston unit removed and the ends 60 and 62 arranged to take the place of the pivot pins 92 and 88 respectively. Such an arrangement is suitable for cultivating and planting operations on level ground.

On a side hill, however, it is desirable to have the adjustable offset feature.

Referring to FIG. 1 a side hill which slopes downward to the right is illustrated diagrammatically, the tractor at 99, the cultivator 21 hitched thereto, my offset actuated hitch shown generally at H mounted on the cultivator, and the grain drill 77 connected to the planter hitch arm 76. Three center lines 97 are shown representing the desirable positions of three rows of grain, and the grain deposit points of the grain drill 77 are illustrated at 95.

Since the cultivator is tending to drift to the right, the cylinder and piston unit is adjusted for the caster wheels 18 to be offset to the left relative to the cultivator and also relative to the grain drill 77 so that in its downhill drifted position the grain deposit points 95 are centered on the center lines 97.

From the foregoing specification it will be obvious that I have provided a relatively simple offset actuated hitch type of implement which can be conveniently adjusted for either right hand or left hand offset to the degree desired and thus compensate for the downward drift of implements on a side hill.

Some changes may be made in the construction and arrangement of the parts of my offset actuated hitch without departing from the real spirit and purpose of my invention.

I claim as my invention:

1. In an offset actuated hitch, an independent-wheel hitch implement comprising a main frame having vertical caster bearings, caster yokes having shanks which are swivel mounted in said caster bearings, wheels journalled in said caster yokes, a pair of brackets adapted to be attached to a cultivator or the like, a parallelogram arm system connecting said main frame to said pair of brackets to keep said caster bearings in substantially vertical position during up, down and sidewise movements of said main frame as it trails the cultivator, and a connecting element between one of said brackets and one arm of said parallelogram arm system to predetermine the lateral offset of said main frame relative to said cultivator.

2. An offset actuated hitch according to claim 1 wherein said connecting element comprises a rod having its ends removably connected to said last mentioned bracket and said last mentioned arm.

3. An offset actuated hitch according to claim 1 wherein said connecting element is extensible and retractable to adjust the degree of offset to the right or left relative to the cultivator, and means to control the extension and retraction thereof.

4. An offset actuated hitch according to claim 1 wherein said connecting element comprises a cylinder and piston unit, and means for controlling the extension and retraction of said unit.

5. An offset actuated hitch according to claim 1 wherein said parallelogram arm system comprises a pair of laterally spaced primary arms, each having its forward end universally connected to one of said pair of brackets and its rear end universally connected to said main frame, and a secondary arm arrangement having its ends universally connected to said brackets and said main frame in a plane vertically spaced from the plane of said primary arms.

6. An offset actuated hitch according to claim 5 wherein said secondary arm arrangement comprises a yoke having its ends pivoted on a horizontal axis to said brackets, and an arm member having its forward end pivoted to the central portion of said last mentioned yoke on a vertical axis and its rear end universally connected to said main frame.

7. An offset actuated hitch according to claim 6 wherein said connecting element comprises a cylinder and piston unit, and means for controlling the extension and retraction of said unit.

8. An offset actuated hitch according to claim 6 wherein said forward ends of said primary arms and the ends of said yoke of said secondary arm system are readily disconnectable relative to said brackets.

(References on following page)

References Cited

UNITED STATES PATENTS

| | | | |
|---|---|---|---|
| 868,213 | 10/1907 | McHenry | 111—17 X |
| 1,422,186 | 7/1922 | Davis | 280—459 |
| 1,898,920 | 2/1933 | Waterman | 111—52 |
| 3,391,663 | 7/1968 | Cagle | 111—52 |

FOREIGN PATENTS

| | | |
|---|---|---|
| 108,608 | 10/1939 | Australia. |
| 537,092 | 6/1941 | Great Britain. |
| 605,165 | 5/1960 | Italy. |

LEO FRIAGLIA, *Primary Examiner.*

U.S. Cl. X.R.

111—52; 172—667; 280—412, 459